United States Patent [19]
Loukidis

[11] 3,780,348
[45] Dec. 18, 1973

[54] SELF-CONTROLLED DIFFERENTIAL SECTIONALISER FOR THE PROTECTION OF LOW VOLTAGE ELECTRIC POWER CONSUMERS

[76] Inventor: Panayotis Coroneou Loukidis, Alkminis St. 8 Gallithea, Athens, Greece

[22] Filed: July 20, 1972

[21] Appl. No.: 273,537

[30] Foreign Application Priority Data
July 20, 1971 Greece................................. 42,911
Apr. 22, 1972 Greece................................. 44,765

[52] U.S. Cl. ..............................317/18 D, 317/27 R
[51] Int. Cl. .......................................... H02h 3/28
[58] Field of Search............... 317/18 R, 18 D, 27 R

[56] References Cited
UNITED STATES PATENTS
2,676,284  4/1954  Bechberger...................... 317/27 R
3,579,038  5/1971  Backderf.......................... 317/18 D
2,594,022  4/1952  Horton............................. 317/27 R Primary Examiner—J. D. Miller
Assistant Examiner—Harvey Fendelman
Attorney—Kenyon & Kenyon Reilly Carr & Chapin

[57] ABSTRACT

A sectionalizer apparatus for disconnecting a load circuit from a supply in response to the occurrence of unbalanced currents in the leads connecting the load to the supply comprises a differential transformer including two magnetic circuits with current primary windings in series with the supply leads and producing zero magnetization when the supply currents are balanced and equally magnetized by a voltage primary winding connected to the supply. Secondary windings on the two magnetic circuits supply respective energizing windings on the two magnetic circuits of a magnetic balance device having contact means connected in the energizing circuit for the operating coil of a contactor controlling the connection of the supply to the load so that unbalanced load currents cause disconnection of the load from the supply. Over-voltage, under-voltage and over-current protection may also be provided by the device.

9 Claims, 4 Drawing Figures

SELF-CONTROLLED DIFFERENTIAL SECTIONALISER FOR THE PROTECTION OF LOW VOLTAGE ELECTRIC POWER CONSUMERS

This invention relates to a sectionalizer apparatus for disconnecting a load circuit from an electrical supply in response to unbalanced currents flowing in the leads to the load.

The sectionalizer apparatus described herein seeks to provide a practical trustworthy and inexpensive solution of the problem of protecting the consumers of low voltage electrical power, against the danger of electrocution, as well as preventing the starting of fires due to electric current leakage to earth.

According to the present invention there is provided apparatus for disconnecting a load circuit from an electrical supply in response to unbalanced currents supplied to the load circuit, comprising a differential transformer including two magnetic circuits, primary current windings arranged to be connected in series with each lead from a supply to a load and to produce balanced magnetization of each of said magnetic circuits in response to balanced currents flowing in said leads, a primary voltage winding arranged to produce equal but opposite magnetization of each of said circuits in response to energization of said winding from said supply, a respective secondary winding linked with each of said magnetic circuits, each said secondary winding being coupled with a respective energizing winding embracing a portion of the core of a differential magnetic balance device having a movable core portion arranged to move in response to unbalanced energization of said core and in so moving to actuate electric contact means controlling the supply of current to the operating coil of a circuit breaker which is arranged when said contact means is so actuated to disconnect said load from said supply.

Preferred features and advantages of the invention will become apparent from the following description of embodiments thereof, taken in conjunction with the drawings, of which:

Figure 1:
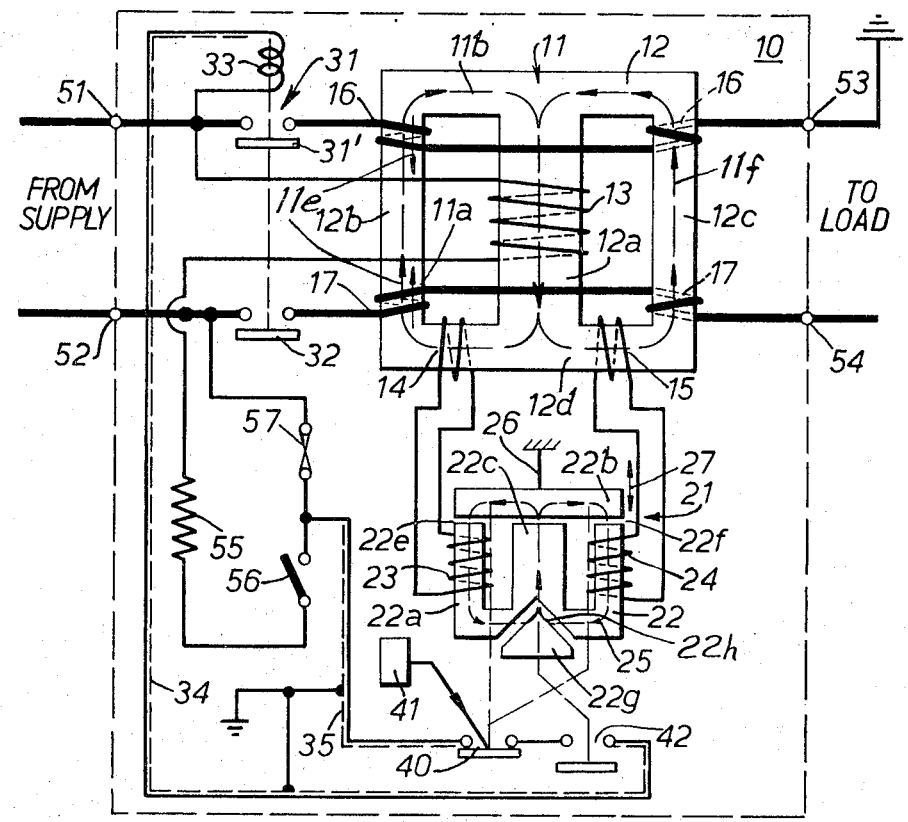
FIG. 1 is a circuit diagram illustrating the arrangement of a sectionalizer apparatus in accordance with the present invention.

The sectionalizer or isolating device 10 illustrated in FIG. 1 comprises three main components, a compound-wound differential transformer 11, having both voltage and current windings, a differential magnetic balance device 21, and an electrically closed circuit breaker isolating switch 31.

The differential transformer may for example have a laminated three-limbed core 12 formed of a known transformer steel and comprising a central limb and two outer limbs symmetrically disposed with respect to the central limb which carries a number of windings as detailed below:

1. A primary voltage winding 13 disposed on the central limb 12a of the core;

2. Two identical secondary windings 14 and 15 each of which is linked with one of the two outer limbs 12b and 12c of the core, although for convenience in illustration each is shown as being disposed upon an end yoke portion 12d of the core;

3. Two identical primary current windings 16 and 17, of which both are in two portions equally distributed between the two side limbs 12b and 12c of the core.

Figure 2:
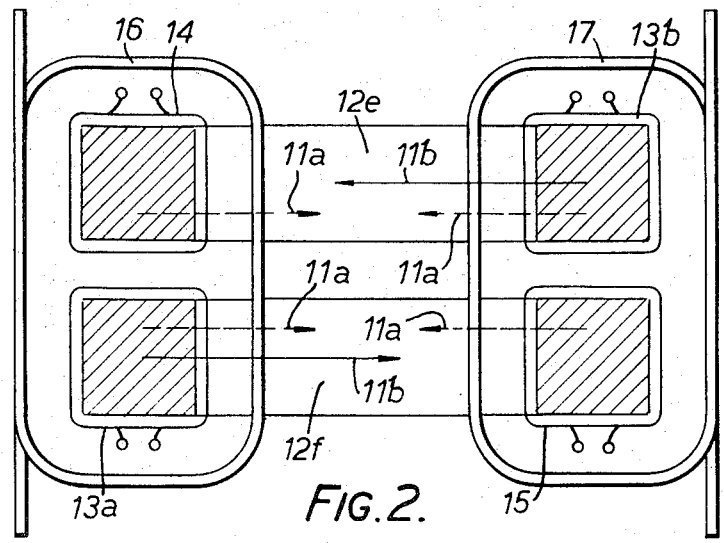
FIG. 2 is a schematic diagram representative of a cross-section through an alternative form of differential transformer which may be used in the arrangement illustrated by FIG. 1.

It will be understood that other forms of core providing appropriate magnetic paths may equally well be employed, for example, FIG. 2 shows one alternative form of core construction in which the core is formed from two identical rings 12e, 12f each of rectangular cross section and both of which are linked with each of the primary current windings 16 and 17. Each of rings 12e, 12f carries a respective half 13a, 13b of the primary voltage winding, and each ring also carries a respective secondary winding 14, 15.

The use of compound excitation for the differential transformer, that is, the production of a relatively small magnetic induction in the core 12 by the voltage primary winding, is found to result in a considerable reduction in the core dimensions and consequently of its weight and cost, as compared with known types of differential transformer used for fault protection, for an equal sensitivity in response. As will be described, the arrangement employed for this transformer enables the provision of a constant self-checking facility as well as providing for a high response speed to the occurrence of a fault.

The differential magnetic balance device 21 has a two-part core 22 of which the two portions 22a and 22b are formed respectively of laminations of E and I form. Portion 22a is stationary and carries on each of its outer limbs one of two identical exciting windings 23, 24 so arranged that the magnetic fluxes which they produce combine additively in the centre limb 22c of the core, as illustrated by the arrowed lines 25. Portion 22b of the core is supported by a flexible element 26 and is spaced from core portion 22a by air gaps 22e, 22f so that portion 22b may rock readily about the support as indicated by double arrow 27, its ends moving respectively towards and away from the respective adjacent outer limbs of core portion 22a, in response to an out-of-balance magnetic condition resulting from an inequality in the currents fed to the two exciting windings 23, 24 from the respective secondary windings of differential transformer 11.

Any movement of core portion 22b of differential magnetic balance device 21 is arranged to actuate normally-closed electrical contacts 40, which are thus opened. When so actuated, contacts 40 can be closed again only by the manual actuation of a push-button 41 operable from outside the apparatus.

A portion 22g of core 22 magnetically urged into a V-shaped gap 22h in core portion 22a, when the core is excited, to close normally-open electric contacts 42. An alternative construction of this device may employ only one set of electrical contacts (for example a mercury switch of minimal size), arranged to be closed upon balanced energisation of the core and to open upon cessation of energisation, but to be tripped open upon unbalanced energisation and then requiring to be re-set manually. Such a device need not necessarily employ the form of core illustrated in FIG. 1.

The described construction of differential magnetic balance device 21 is given by way of example only, as other similar arrangements are suitable for the same purpose. The described construction has the advantage that the moving core position 22b which responds to unbalanced conditions is of very simple construction and the manner in which it is supported by the resilient strip 26 ensures that a minimum amount of energy is required to produce tripping of the protective device. Moreover, the additional moving core portion 22g which actuates contacts 42 performs an important function in ensuring a continuous self-testing function for the apparatus.

The circuit breaker 31 is of any known kind suitable to the nature of the circuit which is to be controlled, it is only necessary that electromagnetic tripping shall be possible. The type of contacts (mercury or solid metal), the number of poles and the make and break capacity are a matter of choice for suitability in a given application. If a circuit breaker having mercury contacts is employed it substantially eliminates the need for preventive maintenance of the apparatus, thus making the reliable operation of the apparatus independent of the human factor, an advantage which outweighs the drawback of a probably higher cost as compared with circuit breakers using solid metal contacts.

The three main items described separately above are connected in the apparatus of FIG. 1 as follows:

The contacts 32, 33 of isolating switch 31 are connected to control connections between input terminals 51, 52 of the apparatus and the current primary windings 16, 17 of differential transformer 11. The other ends of windings 16, 17 are connected to respective output terminals 53, 54. The primary voltage winding 13 of differential transformer 11 is connected in a series circuit from input terminal 51 to input terminal 52 by way of a resistor 55, a single-pole switch 56 and a fuse 57, and is thus energized whenever switch 56 is closed and fuse 57 is unbroken. The tripping winding 33 of isolating switch or circuit breaker 31 is connected in a series circuit from input terminal 51 by way of a first lead 34, normally-open contact 42, normally-open contacts 40, a second lead 35 and fuse 57 to input terminal 52. It is advantageous for leads 34 and 35 to be provided with earthed screens as indicated.

The operation of a sectionalizer or isolating switch illustrated by FIG. 1 is as follows:

a. Off-load operation

The switch is connected between a supply and a power-consuming load, usually between the supply meters and the main distribution panel of an installation in order to protect the entire installation. It is therefore assumed that the incoming lines from the supply, which are connected to input terminals 51, 52, are energized at all times. To actuate circuit breaker 31 by energisation of its operating winding 33, both auxiliary contacts 40 and 42, which are controlled by the differential magnetic balance device 21 must be closed. If contacts 40 have been closed by manual actuation of pushbutton 41, the only way in which these contacts can be closed, then the operation of the circuit breaker depends upon the closing of contacts 42, which can be effected only if the magnetic balance device 21 is excited so as to actuate the movable core portion 22g which controls contacts 42.

It will be seen that the conditions necessary for such energisation of the differential magnetic balance device 21 are as follows:

1. Fuse 57 must be unbroken;

2. Single-pole switch 56 must be closed;

3. Resistor 55 and the windings 13, 14 and 15 of transformer 11 must be uninterrupted;

4. Exciting windings 23, 24 of magnetic balance device 21 must be uninterrupted;

5. All the interconnections between the components mentioned above must be sound.

From the foregoing it is apparent that in order to be closed and to remain closed upon the closing of switch 56, that is, for auxiliary contacts 40 and 41 to remain closed, it is essential that the vibration-sensitive movable portion 22b of the yoke 22 of magnetic balance device 21 shall remain mechanically at rest while being magnetically excited. This condition presupposes the existence of a balanced state of magnetisation in the two sections of stationary yoke portion 22a, since if an unbalanced condition of magnetisation occurs contacts 40 are immediately opened and circuit breaker 31 is tripped.

b. On-load operation

Under normal load conditions the two primary current windings portions 16, 17 placed on each outer limb 11a, 11b of the transformer 11 induce equal but opposite magnetic fluxes in those limbs, because the same current flows through them, as indicated by short arrowed lines 11e. These currents have no effect, therefore, on the voltages induced in the secondary windings 14, 15 which result from the excitation of the core by the voltage primary winding 13 on the central limb, indicated by the arrowed lines 11f. The voltages induced in the two secondary windings 14, 15 are thus equal and the movable core portion 22b of magnetic balance device 21 will remain in magnetic balance and contacts 40 and 42 will remain closed, ensuring the continued closure of circuit breaker 31.

Under abnormal load conditions, when the balance of the currents in the phase and neutral lines is disturbed, as a result of a leakage to earth, by a predetermined minimum amount the resulting differences in the fluxes induced in core limbs 12b, 12c of transformer 11 by the current primary windings 16, 17 thereon will produce a difference in the voltages induced in secondary windings 14, 15 which in turn will result in unbalanced energisation of the magnetic balance device 21. Movable armature portion 22b will therefore be rocked and contact 40 will be released, thus tripping circuit breaker 31, to disconnect the supply from the load.

In the case of a serious phase-to-earth fault, which would be cleared by the actuation of a conventional over-current element (the blowing of a fuse, for example), the operation of the differential protective device provided by the invention will provide a second protective means and will in fact, owing to its very rapid response to a fault condition, often prevent the blowing of a fuse.

In the unlikely case of a direct phase-to-earch fault at the load terminal 53 or 54 of the protective device of FIG. 1 the secondary windings 14, 15 are relieved of dangerous stresses by over-current fuses (not shown) which will normally be provided in each phase lead, by the magnetic saturation of the core 12 of differential transformer 11 and by the high impedance of the windings themselves.

It is an advantage of the apparatus described above that it includes many "fail-safe" features, since a defect in any of a majority of its components will result in the opening of the circuit breaker 31, rather than in its remaining closed. This advantageous condition results because the circuit breaker remains closed as a result of the cooperation of the circuit elements. Any electrical circuit may suffer from three types of fault (regardless of the causes which produce the fault):

a. Total or partial interruption of the circuit;
b. short-circuit (total or partial);
c. loss of insulation (total or partial).

The appearance of any one or more of these faults in the majority of the components of the protective device described above will result in interruption of the supply, rather than it its being maintained in fault conditions.

These advantages are accompanied by a certain power consumption, the losses in the differential transformer 11 and in the resistor 55 together amounting to some 1 to 3 watts. Limiting resistor 55 may be replaced by a small voltage step-down transformer if it is desired still further to reduce the power consumption the choice being a matter of economic and other manufacturing considerations.

The earthed shielding for conductors 34 and 35 is provided because it is essential that any accidental short-circuit between these two conductors, which would prevent the opening of contacts 40 and 42 from having the required effect of tripping circuit breaker 31, must be prevented. If either of conductors 34 and 35 is damaged the resultant earthing of the conductor through the earthed shield will cause the blowing of fuse 57. If preferred, similar protection may be obtained by connecting the shielding for leads 34, 35 to the neutral conductor of the supply, usually connected to input terminal 52.

It is an advantage of the apparatus described that it provides over-voltage protection for the load. When the applied voltage reaches a predetermined critical limiting value (corresponding to the highest allowable voltage) the core of transformer 11 is arranged to become saturated so that the voltages developed in the secondary windings 14 and 15 will no longer be equal at all times, owing to the resultant distortion of the voltage waveform. The resulting unbalance in the magnetic conditions of the differential magnetic balance device 21 results in movement of core portion 22b with resultant tripping of contacts 40 and opening of the circuit breaker 31.

Protection against low voltage of the supply is provided by core portion 22g of differential magnetic balance device 21. When the supply voltage falls below a predetermined level the magnetisation of core 22 will no longer be sufficient to prevent core portion 22g from falling away from the main portion of the core, so that contacts 42 will be opened to trip the circuit breaker, thus disconnecting the supply from loads which could be damaged by low voltage and also assisting the operation of the network by reducing the connected load.

In accordance with a modification of the invention as so far described, it is arranged that the circuit breaker is automatically re-closed after having been tripped as a result of the response of the apparatus to over-voltage. The necessary modifications are illustrated by FIGS. 3 and 4 of the drawings.

The sectionalizer apparatus 10 illustrated by FIG. 3 is generally similar to the apparatus described above in relation to FIG. 1 and for this reason many parts which remain unchanged are shown partially or are omitted from FIG. 3, and will not be again described. The difference from FIG. 1 consists in the provision of an over-voltage relay 61 having an operating coil 61a and having a normally-closed contact 62 which is opened when the voltage applied to the relay operating coil exceeds a predetermined threshold level. Relay 61 is shown as having a further, normally-open contact 63, but this is not essential to the basic modification and in the first part of the description will be disregarded and may be considered as replaced by a direct connection.

The operating coil 61a of relay 61 is connected between terminal 51 and fuse 57, which in turn is connected to terminal 52. The relay is thus responsive to the supply voltage and contact 62 closes if this supply voltage exceeds a predetermined maximum value. Contact 62 of relay 61 is connected in series with the voltage primary winding 13 of differential transformer 11, so that in the event of an over-voltage occurring the voltage supply to transformer 11 will be disconnected and as described above in relation to FIG. 1, contact 42 of differential magnetic balance device 21 will be opened and circuit breaker 31 thus opened to disconnect the supply from the load.

Figure 3:
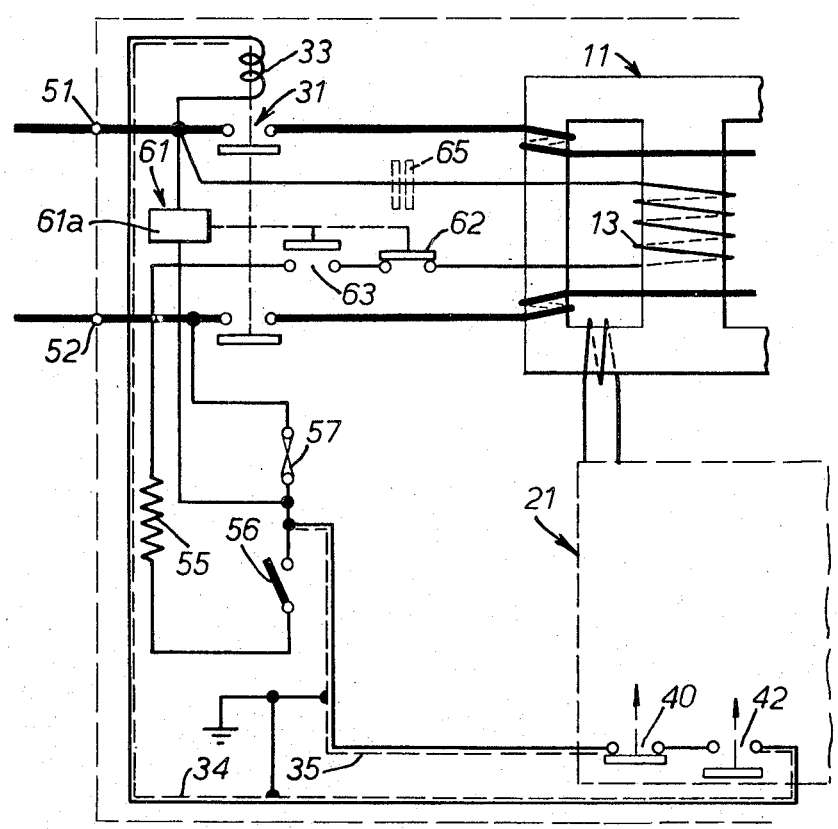
FIG. 3 is a partial circuit diagram illustrating a possible modification to the arrangement of FIG. 1.
Figure 4:
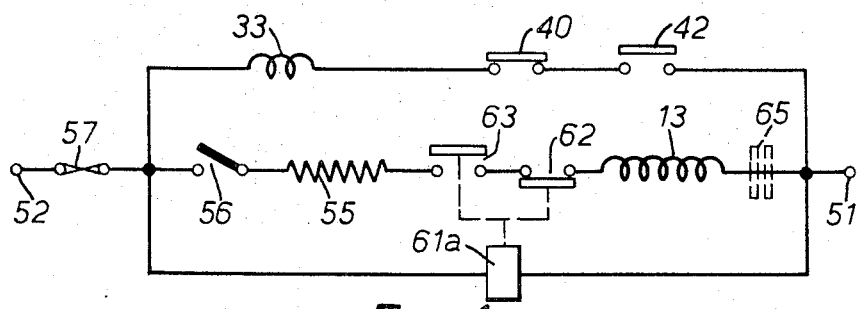
FIG. 4 is a block schematic diagram illustrating a modification of the arrangement of FIG. 1.

FIG. 4 is a circuit diagram showing the control circuit for the operating coil 33 of circuit breaker 31 in the arrangement of FIG. 3, as well as the circuit by which voltage is applied to the voltage primary winding 13 of differential transformer 11.

In order to provide an improved low-voltage trip facility it is possible to provide over-current relay 61 with an additional normally-open contact 63 which is closed whenever a voltage exceeding a threshold level substantially below the nominal supply voltage is applied to the relay. This contact is, as shown, connected in series with normally-closed contact 62 which opens when a threshold level substantially above the nominal supply voltage is exceeded, as already described. By this means the circuit breaker 31 will be tripped whenever the supply voltage passes out of a predetermined range including the nominal supply voltage.

FIGS. 3 and 4 also show in broken line a capacitor 65 also connected in series with voltage primary winding 13. This capacitor may have a value chosen to adjust the phase of the current flowing in the voltage primary winding 13 so that this current is in phase with the currents flowing in the current primary windings 16 and 17, thus providing maximum sensitivity for current unbalance in the supply leads.

It will be understood that although the invention has been described with reference to a single-phase supply arrangement in which it is assumed that one of the current primary windings is connected in a phase lead and the other in a neutral lead, the device may be modified in an obvious manner to provide protection against current unbalance in either two-phase or three-phase supplies, the latter being of either three-wire or four-wire type. The only change necessary is to provide a circuit breaker 31 with the appropriate number of contacts and to provide the necessary number of current windings on differential transformer 11.

In another modification of the previously described arrangements the contacts 40 and 42 of differential magnetic balance device 21 may be replaced by a single set of contacts, advantageously a mercury contact device. Obviously it is necessary to arrange that this contact device is appropriately operated in response to movement either of core portion 22b or of core portion 22g of the device.

In a further modification of differential magnetic balance device 21 it is arranged that a single movable core portion only is used. This may be done by dispensing with moveable core portion 22g and mounting core portion 22b for to move both by rocking in response to unbalance in the magnetic conditions of the core and by translation in response to energization of the core, the latter movement being arranged to close a contact set and the former movement to open a contact set, both these sets or a single contact set actuated appropriately by both movements, being connected as described in the energizing circuit for the operating coil 33 of circuit breaker 31.

I claim:

1. In a sectionalizer apparatus for disconnecting an electrical load circuit from a supply in response to the occurrence of unbalanced currents in the leads connecting said load circuit to said supply, the improvement which comprises:

differential transformer means including two magnetic circuits;

an individual primary current winding connected in series with each said supply lead and linked with each of said magnetic circuits to produce zero magnetization thereof in response to balanced currents in said leads;

a primary voltage winding connected to said supply and linked with each of said magnetic circuits to produce equal magnetic fluxes therein;

a respective secondary winding linked with each of said magnetic circuits;

a differential magnetic balance device including core means comprising two magnetic circuits each with a respective energizing winding, electrical contact means and armature means responsive to unbalanced magnetization of said magnetic circuits by movement to actuate said contact means;

means connecting each said secondary winding of said differential transformer means to a respective energizing winding of said differential magnetic balance means;

contactor means controlling the connection of said supply to said load circuit by way of said leads, said contact means having an operating coil;

and an electrical circuit including said supply and said contact means of said differential magnetic balance means for energizing said operating coil of said contactor means.

2. The improvement claimed in claim 1 wherein said armature means comprises a movable core portion mounted for rocking movement in response to unbalanced magnetization of said magnetic circuits thereby to actuate said contact means to prevent the energization of said contactor means operating coil.

3. The improvement claimed in claim 2 wherein said differential magnetic balance device comprises also an armature means arranged to be displaced by translation in response to energization of said core thereby to operate electrical contact means to permit the energization of said contactor means operating coil.

4. The improvement claimed in claim 3 wherein said armature means is arranged to be displaced both by rocking and by translation to actuate electrical contact means respectively to prevent and to permit energization of said contactor means operating coil.

5. The improvement claimed in claim 3 wherein a single electrical contact means is actuated by rocking movement of a said armature means to prevent and by translatory movement of a said armature means to permit energization of said contactor means operating coil.

6. The improvement claimed in claim 1 including an over-voltage relay having an operating winding connected to said supply and contact means opened in response to the supply voltage exceeding a predetermined level, and an electrical circuit including said relay contact means connecting said voltage primary winding to said supply.

7. The improvement claimed in claim 6 wherein said over-voltage relay contact means is closed only when said supply voltage is between predetermined upper and lower limiting levels.

8. The improvement claimed in claim 1 wherein said differential transformer means includes a core including a central limb and two outer limbs symmetrically disposed with respect to said central limb and joined thereto by yoke portions to form said two magnetic circuits, and wherein said voltage primary winding is disposed upon said central limb and said current primary windings are each divided into equal portions disposed respectively upon said outer limbs.

9. The improvement claimed in claim 1 wherein said differential transformer means includes two magnetically separate closed magnetic cores, said voltage primary winding and said secondary winding being each divided into two equal portions disposed respectively upon said separate magnetic citcuits and said current primary windings each embracing both said magnetic circuits.

* * * * *

UNITED STATES PATENT OFFICE
CERTIFICATE OF CORRECTION

Patent No. 3,780,348             Dated December 18, 1973

Inventor(s) Panayotis Coroneou Loukidis

It is certified that error appears in the above-identified patent and that said Letters Patent are hereby corrected as shown below:

Column 3, line 40, "normally-open" should be changed to -- normally-closed --,

Column 4, line 10, "41" should be changed to -- 42 --,

Column 4, line 57, "53 or" should be omitted,

Column 5, line 39, after the word "saturated" should be inserted -- or overly excited --, Column 6, line 14, change "closes" to -- opens --, Column 6, line 31, change "over-current" to -- over-voltage --.

Signed and sealed this 17th day of September 1974.

(SEAL)
Attest:

McCOY M. GIBSON, JR.
Attesting Officer

C. MARSHALL DANN
Commissioner of Patents